United States Patent
Miyanaga et al.

(10) Patent No.: US 11,074,518 B2
(45) Date of Patent: Jul. 27, 2021

(54) COMPUTER SYSTEM, GENERATION METHOD OF PLAN, AND NON-TRANSITORY COMPUTER READABLE STORAGE MEDIUM

(71) Applicant: Hitachi, Ltd., Tokyo (JP)

(72) Inventors: Mizuki Miyanaga, Tokyo (JP); Tadashi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 16/801,658

(22) Filed: Feb. 26, 2020

(65) Prior Publication Data

US 2021/0089950 A1    Mar. 25, 2021

(30) Foreign Application Priority Data

Sep. 20, 2019    (JP) .............................. JP2019-171969

(51) Int. Cl.
*G06F 7/60* (2006.01)
*G06N 7/00* (2006.01)
*G06N 5/02* (2006.01)

(52) U.S. Cl.
CPC ............. *G06N 7/005* (2013.01); *G06N 5/025* (2013.01)

(58) Field of Classification Search
CPC ...................................... G06N 7/005
USPC ............................................. 703/2
See application file for complete search history.

(56) References Cited

U.S. PATENT DOCUMENTS

| 2014/0222487 A1* | 8/2014 | Grose | ................... | G06Q 10/04 |
| | | | | 705/7.23 |
| 2019/0228360 A1* | 7/2019 | Aoyama | .............. | G05B 19/418 |
| 2020/0364728 A1* | 11/2020 | Jin | ..................... | G06Q 30/0205 |

FOREIGN PATENT DOCUMENTS

WO       2018/220744 A1    12/2018

* cited by examiner

*Primary Examiner* — Timothy A Mudrick
(74) *Attorney, Agent, or Firm* — Procopio, Cory, Hargreaves & Savitch LLP

(57) ABSTRACT

A computer system holds model management information for managing a model for calculating, based on a feature amount of a process pair generated based on a plan history and formed of two processes, a transition probability of the two processes forming the process pair. The computer system comprises: a transition probability calculating unit uses, in a case of receiving input data including a plurality of target processes, the model management information and a feature amount of a process pair formed of a reference target process and a transition destination target process, to thereby calculate a transition probability of the process pair; and a transition probability modifying unit modifies the transition probability of the process pair determined to be unreliable. The transition probability calculating unit generates a new plan by determining the order of execution of the plurality of target processes based on the transition probability of the process pair.

15 Claims, 10 Drawing Sheets

| PLAN ID 201 | ORDER 202 | PROCESS ID 203 | WIDTH 204 | LENGTH 205 | THICKNESS 206 | USER ID 207 | ESTIMATED TIME 208 120 |
|---|---|---|---|---|---|---|---|
| 1 | 1 | P6 | 1105 | 500 | 10 | USER 1 | 2019/5/10 13:30:00 |
| 1 | 2 | P2 | 1110 | 498 | 13 | USER 1 | 2019/5/10 13:30:05 |
| 1 | 3 | P4 | 1005 | 493 | 11 | USER 1 | 2019/5/10 13:30:10 |
| 1 | ... | ... | ... | ... | ... | ... | ... |
| 2 | 1 | P2 | 1125 | 505 | 11 | USER 2 | 2019/5/12 11:00:00 |
| 2 | 2 | P5 | 1115 | 496 | 14 | USER 2 | 2019/5/12 11:00:05 |
| 2 | ... | ... | ... | ... | ... | ... | ... |
| ... | ... | ... | ... | ... | ... | ... | ... |

FIG. 2

| CONDITION ID (301) | CONSTRAINT CONDITION (302) | VIOLATION AMOUNT (303) |
|---|---|---|
| 1 | SORT BY ASCENDING LENGTH. | IF THE CONDITION IS VIOLATED : 1<br>IF THE CONDITION IS NOT VIOLATED : 0 |
| 2 | THE DIFFERENCE IN LENGTH BETWEEN FRONT AND REAR PRODUCTS IS 5cm OR LESS. | IF THE CONDITION IS VIOLATED : HOW MUCH IS EXCEEDED? |
| 3 | PLACE PRODUCTS WITH MAXIMUM WIDTH UP TO THE 10TH. | IN CASE OF ARRANGEMENT IS 10TH OR LATER : HOW FAR FROM 10TH. |
| 4 | THE DIFFERENCE IN THICKNESS BETWEEN FRONT AND REAR PRODUCTS IS 4mm OR LESS. | IF THE CONDITION IS VIOLATED : THICKNESS DIFFERENCE |
| ... | ... | ... |

FIG. 3

| TRANSITION DESTINATION PROCESS | FEATURE AMOUNT | | TRANSITION PROBABILITY (BEFORE) | DEGREE OF RELIABILITY | TRANSITION PROBABILITY (AFTER) |
|---|---|---|---|---|---|
| | WIDTH DIFFERENCE | DELIVERY DEADLINE | | | |
| C | 4 | 3 | 0.01 | 0 | 0.5 |
| D | 3 | 13 | 0.99 | 1 | 0.5 |

MODIFICATION PROPOSAL

APPLY  CANCEL

FIG. 10

COMPUTER SYSTEM, GENERATION METHOD OF PLAN, AND NON-TRANSITORY COMPUTER READABLE STORAGE MEDIUM

CLAIM OF PRIORITY

The present application claims priority from Japanese patent application JP 2019-171969 filed on Sep. 20, 2019, the content of which is hereby incorporated by reference into this application.

BACKGROUND OF THE INVENTION

This invention relates to a technology of generating a plan that defines an order of processes, for example, a production plan for a product.

In many cases, such as production of a product, and operation and management of a large-scale system, a production order or a work order is planned in advance. Plans in such cases are required to be created in consideration of constraint conditions on various matters such as time, space, and resources such as facilities and humans.

When a plan is manually created, there is a limitation on the accuracy and efficiency, and thus, in recent years, a computer has been used more often than before. For example, a technology as described in WO 2018/220744 is known.

In WO 2018/220744, it is described that: "A production plan creation device in which a planning unit uses history information relating to production plans for individual products planned in the past as a basis to calculate a plan pattern including a production order for each of the products while taking into account each of restricting conditions on the occasion of production of each of the products, then creates a plurality of plan candidates relating to a production plan for each of the products in which the production order of each of the products is rearranged in accordance with the calculated plan pattern. A plan evaluation unit evaluates the plurality of plan candidates on the basis of an evaluation index for each of the restricting conditions and selects an optimal production plan from among the plurality of plan candidates."

SUMMARY OF THE INVENTION

In the technology described in WO 2018/220744, a model (plan pattern) is generated based on past plans. Only a small number of plans are generated under exceptional cases such as special conditions or situations. As a result, information on plans generated under exceptional cases is not sufficiently reflected in models. As a result, an optimal plan is not always generated by using such models.

This invention has an object to provide a technology of generating an optimal plan even under exceptional cases.

A representative example of the present invention disclosed in this specification is as follows: a computer system, which is configured to generate a plan that defines an order of execution of a plurality of processes, comprises at least one computer having an arithmetic device and a storage device, and holds model management information for managing a model for calculating, based on a feature amount of a process pair generated based on a plan history and formed of two processes, a transition probability of the two processes forming the process pair. The computer system comprises: a transition probability calculating unit configured to, in a case of receiving input data including a plurality of target processes, use the model management information and a feature amount of a process pair formed of a reference target process and a transition destination target process, to thereby calculate a transition probability of the process pair; and a transition probability modifying unit configured to: determine whether the transition probability of the process pair is reliable based on an evaluation standard; and modify the transition probability of the process pair determined to be unreliable. The transition probability calculating unit is configured to generate a new plan by determining the order of execution of the plurality of target processes based on the transition probability of the process pair.

According to at least one embodiment of this invention, it is possible to generate an optimal plan even under exceptional cases. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 2 is a table for showing an example of a data structure of a plan history database in the first embodiment;

FIG. 3 is a table for showing an example of a data structure of a constraint condition database in the first embodiment;

FIG. 10 is a diagram for illustrating an example of a screen to be presented by the candidate plan generating unit in the second embodiment.

DETAILED DESCRIPTION OF THE PREFERRED EMBODIMENTS

Figure 1:
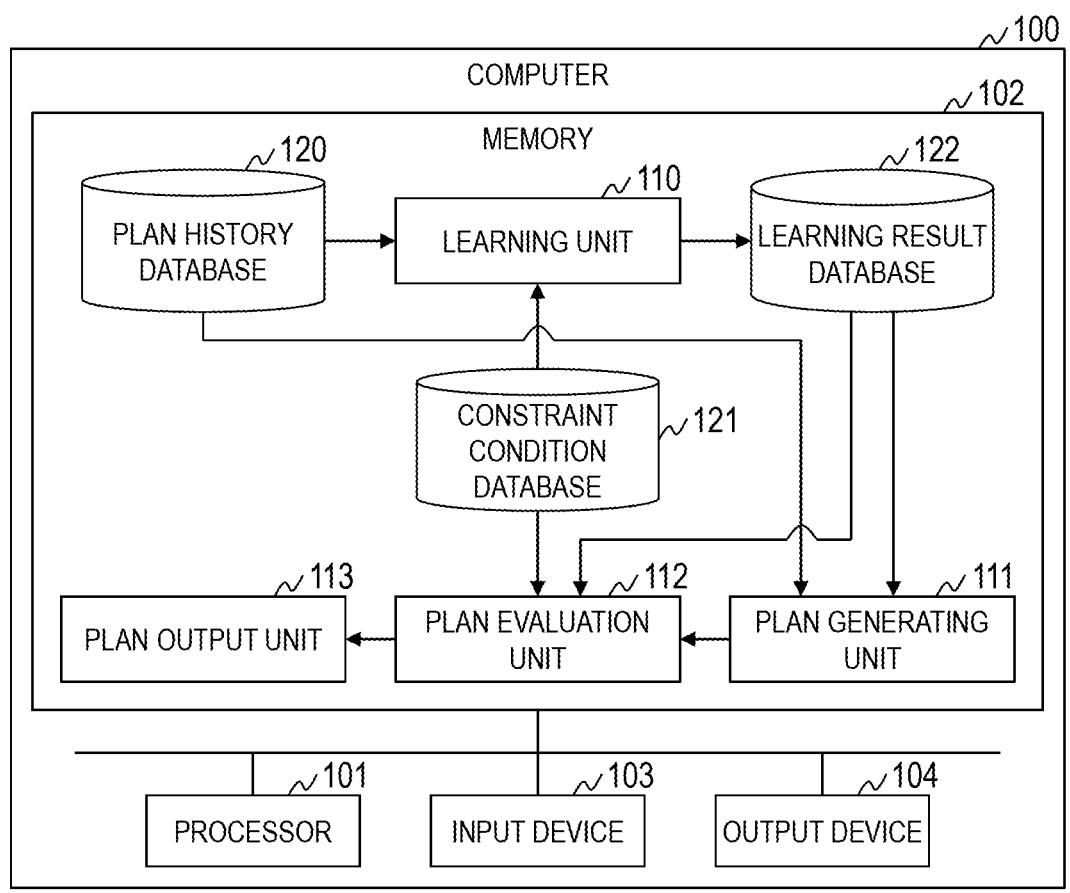
FIG. 1 is a diagram for illustrating a hardware configuration and software configuration of a computer in a first embodiment of this invention.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

FIG. 1 is a diagram for illustrating a hardware configuration and software configuration of a computer 100 in a first embodiment of this invention.

The computer 100 includes a processor 101, a memory 102, an input device 103, and an output device 104. Those pieces of hardware are coupled to one another via a bus, for example. The computer 100 may include a storage device such as a hard disk drive (HDD) and a solid state drive (SSD), and a network interface.

The processor 101 is configured to execute a program stored in the memory 102. The processor 101 executes processing in accordance with the program, to thereby operate as a functional unit (module) for implementing a specific function. In the following, when processing is described with a specific functional unit serving as a subject of a sentence, this means that the processor 101 executes a program for implementing the functional unit.

The memory 102 stores a program to be executed by the processor 101 and data to be used by the program. Further, the memory 102 includes a work area to be temporarily used by a program. The program and data stored in the memory 102 are described later.

The input device 103 is a device to be used to input data and an instruction to the computer 100. The input device 103 is, for example, a keyboard, a mouse, or a touch panel. The output device 104 is a device to be used by the computer 100 to output data. The output device 104 is, for example, a display or a printer.

Now, a description is given of programs and data stored in the memory 102. The memory 102 stores programs for implementing a learning unit 110, a plan generating unit 111, a plan evaluation unit 112, and a plan output unit 113. Further, the memory 102 stores a plan history database 120, a constraint condition database 121, and a learning result database 122.

The plan history database 120 is a database for managing a history of past plans. The plan history database 120 may store a plan created by a user or a plan generated by the plan generating unit 111. The data structure of the plan history database 120 is described with reference to FIG. 2.

The constraint condition database 121 is a database for managing a constraint condition on generation of a plan. Details of the data structure of the constraint condition database 121 are described with reference to FIG. 3.

The learning result database 122 is a database for managing results of processing by the learning unit 110. Details of the data structure of the learning result database 122 are described with reference to FIG. 4A and FIG. 4B.

The learning unit 110 is configured to use the plan history database 120 to generate a model for calculating a probability of transition from one process to another process. Further, the learning unit 110 is configured to use the plan history database 120 and the constraint condition database 121 to calculate an evaluation index for evaluating a degree of violation of a constraint condition by past plans. The learning unit 110 stores the model and the evaluation index in the learning result database 122.

The plan generating unit 111 is configured to generate a candidate plan based on the model stored in the learning result database 122 and the plan history database 120. It is assumed herein that a plan relating to production of a product is generated.

The plan evaluation unit 112 is configured to calculate an evaluation value for a candidate plan based on the evaluation index stored in the learning result database 122 and the constraint condition database 121, and select a plan to be output from among candidate plans based on the evaluation value.

The plan output unit 113 is configured to output the plan selected by the plan evaluation unit 112.

Regarding each functional unit included in the computer, a plurality of functional units may be integrated into one functional unit, or one functional unit may be divided into a plurality of functional units for each function. For example, the plan generating unit 111 may include the function of the plan evaluation unit 112.

Similar functions may be implemented by using a computer system constructed by a plurality of computers 100. In this case, a functional unit may be distributed among a plurality of computers, or information may be distributed among a plurality of functional units.

FIG. 2 is a table for showing an example of the data structure of the plan history database 120 in the first embodiment.

The plan history database 120 stores an entry formed of a plan ID 201, an order 202, a process ID 203, a width 204, a length 205, a thickness 206, a user ID 207, and an estimated time 208. There is one entry for one plan. Further, the number of rows contained in one entry is the same as the number of processes included in the plan.

The plan ID 201 is a field for storing identification information on a plan. The order 202 is a field for storing the order of a process in a plan. The process ID 203 is a field for storing identification information on a process.

The width 204, the length 205, and the thickness 206 are each a field for storing a dimension of a product handled in a process corresponding to the process ID 203. The width 204, the length 205, and the thickness 206 are examples of a parameter to be considered in a process, and are not limited thereto.

The user ID 207 is a field for storing identification information on a user being a creator of a plan. When the plan generating unit 111 generates a plan, a value indicating generation by the plan generating unit 111 may be stored together with the identification information on a user who has used the plan.

The estimated time 208 is a field for storing an estimated time at which a process is to be executed.

FIG. 3 is a table for showing an example of the data structure of the constraint condition database 121 in the first embodiment.

The constraint condition database 121 stores an entry formed of a condition ID 301, a constraint condition 302, and a violation amount 303. There is one entry for one constraint condition.

The condition ID 301 is a field for storing identification information on a constraint condition.

The constraint condition 302 is a field for storing details of a specific constraint condition. In FIG. 3, sentences are described as the constraint conditions to facilitate understanding. However, mathematical expressions, program codes, or the like may be stored.

The violation amount 303 is a field for storing a definition of a method of calculating a value indicating the degree of violation of a constraint condition corresponding to the entry. In FIG. 3, sentences are described as the definitions of the calculation method to facilitate understanding. However, mathematical expressions, program codes, or the like may be stored.

Figure 4A:
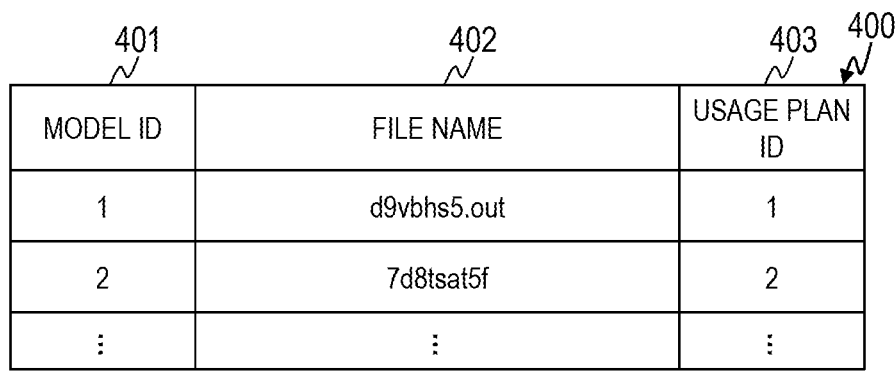
FIG. 4A and FIG. 4B are each a table for showing an example of the data structure of a learning result database in the first embodiment.
Figure 4B:
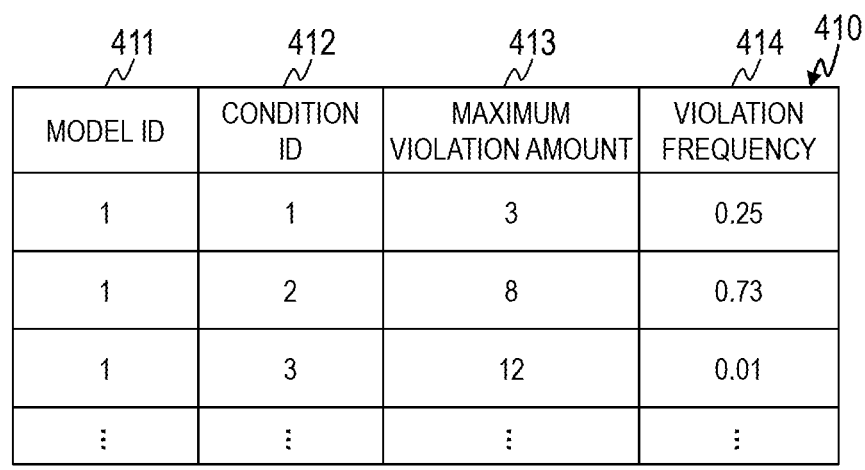

FIG. 4A and FIG. 4B are each a table for showing an example of the data structure of the learning result database 122 in the first embodiment.

The learning result database 122 stores model management information 400 and evaluation index management information 410.

The model management information 400 is information for managing a model. The model management information 400 stores an entry formed of a model ID 401, a file name 402, and a usage plan ID 403. There is one entry for one model.

The model ID 401 is a field for storing identification information on a model. The file name 402 is a field for storing the name of a file storing an actual model. A field for storing a file instead of the file name 402 may be provided.

The usage plan ID 403 is a field for storing identification information on a plan history that was used to generate a model. The identification information set in the usage plan ID 403 is the same as identification information set in the plan ID 201. The usage plan ID 403 may store two or more pieces of identification information.

The evaluation index management information 410 is information for managing an evaluation index of each model. The evaluation index management information 410 stores an entry formed of a model ID 411, a condition ID 412, a maximum violation amount 413, and a violation frequency 414. There is one entry for one combination of a model and a constraint condition.

The model ID 411 is the same field as the model ID 401, and the condition ID 412 is the same field as the condition ID 301.

The maximum violation amount 413 is a field for storing a maximum value indicating the degree of violation of a constraint condition by a model. The violation frequency 414 is a field for storing a value indicating a frequency of violation of the constraint condition by the model. Values stored in the maximum violation amount 413 and the violation frequency 414 are calculated by using the method described in WO 2018/220744.

Next, a description is given of processing to be executed by the computer 100. First, a description is given of processing for generating a model.

Figure 5:
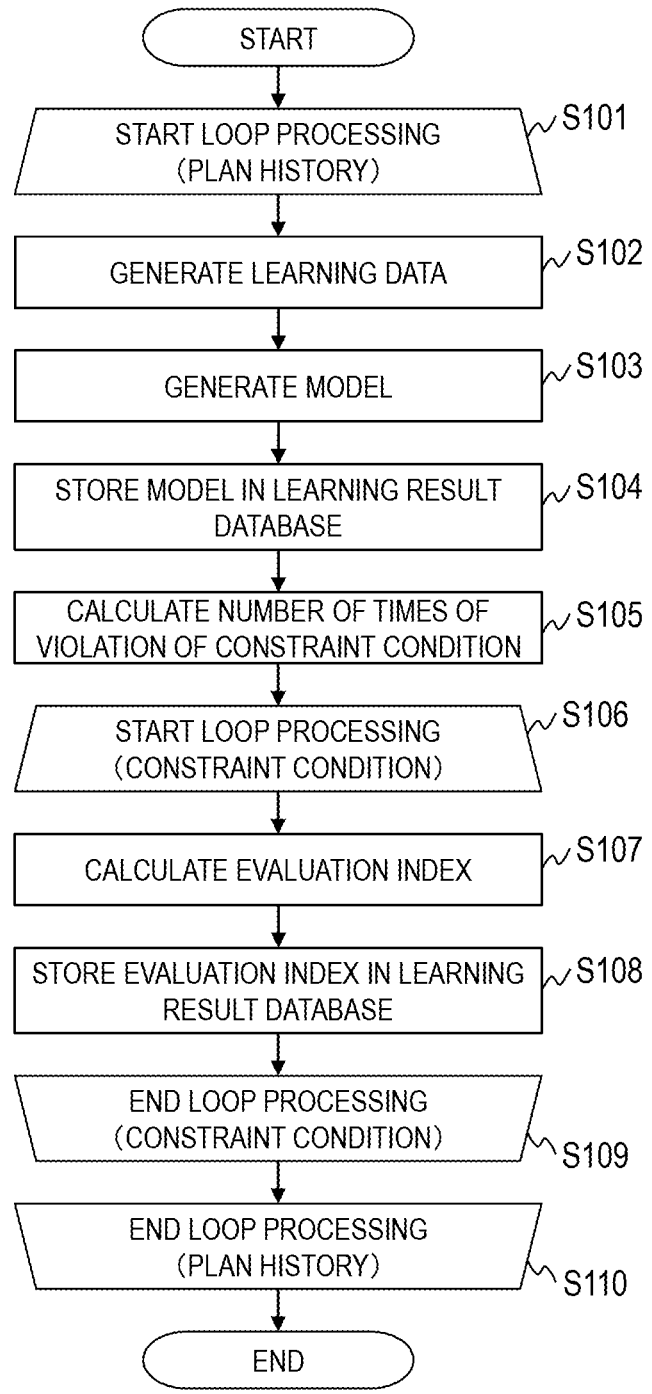
FIG. 5 is a flow chart for illustrating an example of learning processing to be executed by a learning unit in the first embodiment.

FIG. 5 is a flow chart for illustrating an example of learning processing to be executed by the learning unit 110 in the first embodiment.

The learning unit 110 starts loop processing for a plan history (Step S101). The learning unit 110 obtains a target plan history from among plan histories stored in the plan history database 120. It is assumed that one plan history is obtained as the target plan history. Two or more plan histories may be obtained, or a plan history specified by the user may be obtained.

The learning unit 110 generates learning data based on the target plan history (Step S102). Specifically, the following processing is executed.

(Step S102-1) The learning unit 110 generates process pairs based on a plurality of processes included in the target plan history. A process pair includes a reference process and a transition destination process. The process pair represents transition from the reference process to the transition destination process. Thus, a process pair in which a process P1 is the reference process and a process P2 is the transition destination process and a process pair in which the process P1 is the transition destination process and the process P2 is the reference process are treated as different process pairs.

(Step S102-2) The learning unit 110 calculates a feature amount of each of the process pairs. For example, the learning unit 110 calculates a difference between parameters to be considered in a process as the feature amount. In the example shown in FIG. 2, a difference between the widths 204, a difference between the lengths 205, and a difference between the thicknesses 206 are calculated as the feature amounts. The learning unit 110 may calculate the number of days (delivery deadline) from a current date to a delivery date as the feature amount.

(Step S102-3) The learning unit 110 assigns a label to the each of the process pairs. The learning unit 110 assigns a label "1" to the process pair in a case where the target plan history stores arrangement of processes corresponding to the process pair, whereas the learning unit 110 assigns a label "0" to the process pair in a case where the target plan history does not store arrangement of processes corresponding to the process pair.

(Step S102-4) The learning unit 110 outputs data formed of the process pair, the feature amount, and the label as learning data. This concludes the description of the processing of Step S102.

Next, the learning unit 110 sets the label as an objective variable, and sets the feature amount as an explanatory variable, and applies a known algorithm, for example, a gradient boosting tree, to thereby generate a model for calculating the probability of transition from one process to another process (Step S103). At this time, the learning unit 110 assigns a file name to the model. In at least one embodiment of this invention, there is no limitation on the algorithm to be applied.

Next, the learning unit 110 stores the model in the model management information 400 of the learning result database 122 (Step S104).

Specifically, the learning unit 110 adds an entry to the model management information 400, and sets identification information in the model ID 401 of the added entry. Further, the learning unit 110 stores the file name assigned to the model in the file name 402 of the added entry, and stores the identification information on the target plan history in the usage plan ID 403.

Next, the learning unit 110 calculates the number of times of violation of each constraint condition in the target plan history (Step S105).

Next, the learning unit 110 starts loop processing for a constraint condition (Step S106). The learning unit 110 selects a target constraint condition from among constraint conditions set in the constraint condition database 121.

The learning unit 110 calculates an evaluation index for evaluating the degree of violation of the target constraint condition in the target plan history (Step S107). Specifically, the following processing is executed.

(Step S107-1) The learning unit 110 calculates a frequency of violation of the target constraint condition. For example, the learning unit 110 calculates, as the frequency of violation of the target constraint condition, a value obtained by dividing the number of times of violation of the target constraint condition by the total number of times of violation of constraint conditions.

(Step S107-2) The learning unit 110 calculates an amount of violation of the target constraint condition. The violation amount is calculated based on the violation amount 303 of an entry corresponding to the target constraint condition. Further, the learning unit 110 calculates a maximum value of the violation amount of the target constraint condition. In a case where the violation frequency of the target constraint condition is 0, the learning unit 110 may set the maximum value of the violation amount as an infinite value.

(Step S107-3) The learning unit 110 outputs the maximum value of the violation amount and the violation frequency as the evaluation index. This concludes the description of the processing of Step S107.

Next, the learning unit 110 stores the evaluation index in the evaluation index management information 410 of the learning result database 122 (Step S108).

Specifically, the learning unit 110 adds an entry to the evaluation index management information 410, sets identification information on the model in the model ID 411 of the added entry, and sets identification information on the target constraint condition in the condition ID 412. Further, the learning unit 110 sets the calculated maximum value of the violation amount and the calculated violation frequency in the maximum violation amount 413 and the violation frequency 414 of the added entry, respectively.

Next, the learning unit 110 determines whether processing is complete for all the constraint conditions (Step S109).

In a case where it is determined that processing is not complete for all the constraint conditions, the learning unit 110 returns to Step S106 to execute similar processing. In a case where it is determined that processing is complete for all the constraint conditions, the learning unit 110 determines whether processing is complete for all the plan histories (Step S110).

In a case where it is determined that processing is not complete for all the plan histories, the learning unit 110 returns to Step S101 to execute similar processing. In a case where it is determined that processing is complete for all the plan histories, the learning unit 110 ends the processing.

Figure 6:
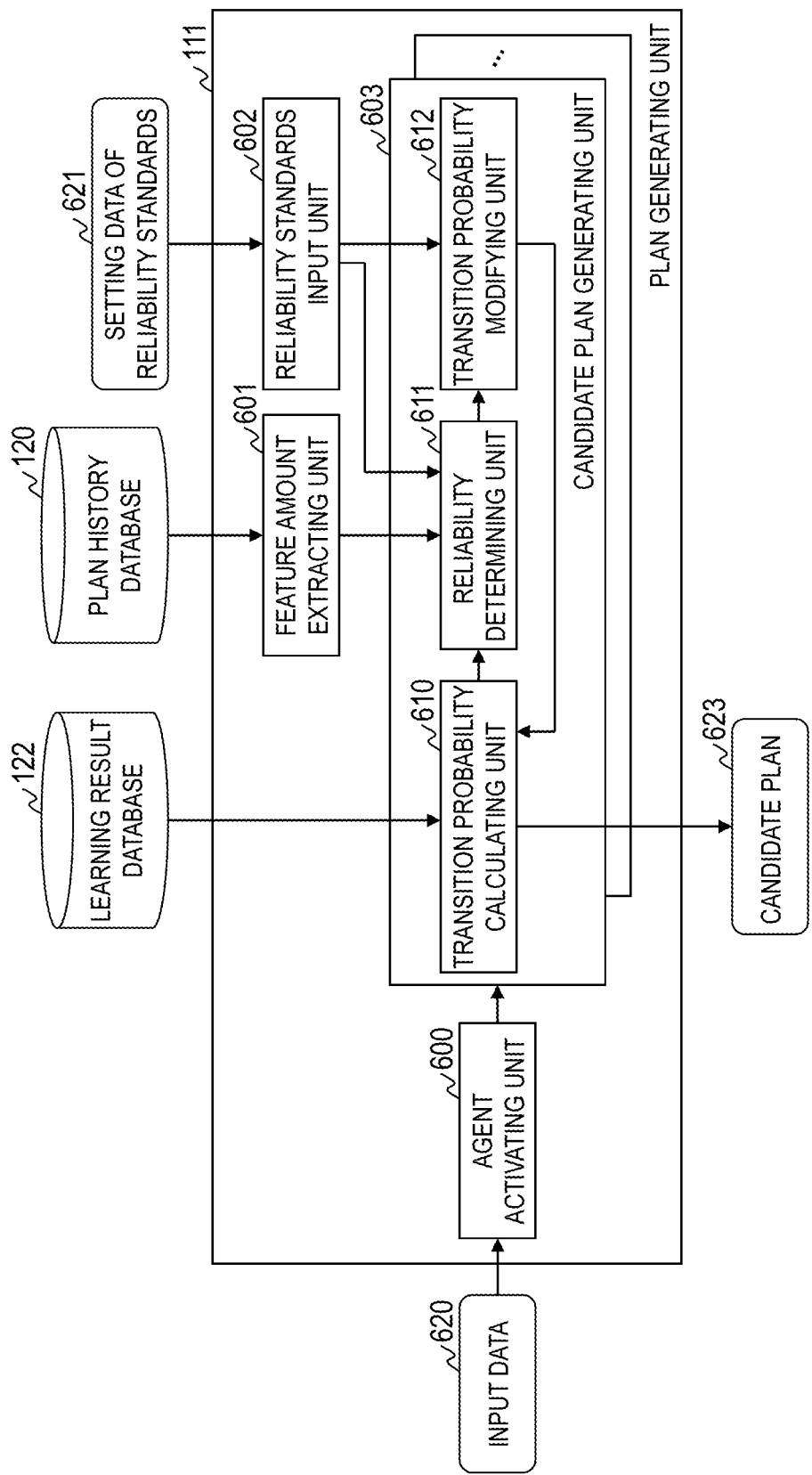
FIG. 6 is a diagram for illustrating an example of the detailed configuration of a plan generating unit in the first embodiment.
Figure 7:
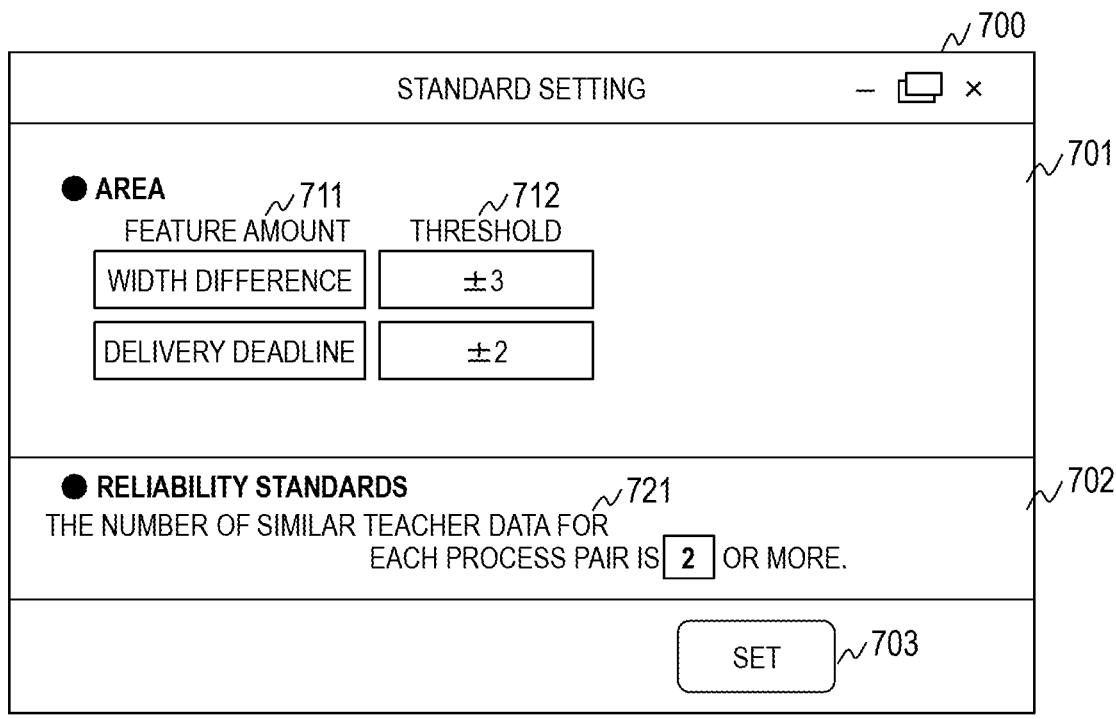
FIG. 7 is a diagram for illustrating an example of a screen to be presented by the plan generating unit in the first embodiment.

Next, a description is given of a method of generating a new plan that uses a model. First, a description is given of a detailed configuration of the plan generating unit 111. FIG. 6 is a diagram for illustrating an example of the detailed configuration of the plan generating unit 111 in the first embodiment. FIG. 7 is a diagram for illustrating an example of a screen to be presented by the plan generating unit 111 in the first embodiment.

The plan generating unit 111 includes an agent activating unit 600, a feature amount extracting unit 601, a reliability standards input unit 602, and a candidate plan generating unit 603.

In a case of receiving input data 620 for generating a new plan, the agent activating unit 600 calls the candidate plan generating unit 603 to input the input data 620. Further, the agent activating unit 600 inputs the input data 620 to the feature amount extracting unit 601.

The input data 620 includes data on a plurality of processes. Data on one process at least includes identification information on the process and parameters of that process.

In the first embodiment, it is assumed that one candidate plan generating unit 603 generates one candidate plan 623. Thus, the number of candidate plan generating units 603 to be called is the same as that of the candidate plans 623 to be generated. It is assumed that the number of candidate plans 623 to be generated is set in advance.

The feature amount extracting unit 601 extracts the feature amount of the process pair generated based on the plan history, and inputs the feature amount of the process pair to the candidate plan generating unit 603.

The reliability standards input unit 602 receives input of the reliability of a transition probability of the process pair, namely, setting data 621 of reliability standards for determining the reliability of the model. The reliability standards input unit 602 presents such an input screen 700 as illustrated in FIG. 7, for example.

The input screen 700 includes an area setting field 701, a reliability standards setting field 702, and a set button 703.

The area setting field 701 is a field for setting the area of a feature amount space formed by the feature amount of a process pair. The area setting field 701 includes a feature amount setting field 711 and a threshold setting field 712.

There is one combination of the feature amount setting field 711 and the threshold setting field 712 for one feature amount. The feature amount setting field 711 is a field for setting the type of a feature amount. The threshold setting field 712 is a field for setting a threshold to be used for determining the similarity between the process pairs.

A field for setting a distance in the feature amount space may be provided instead of the feature amount setting field 711 and the threshold setting field 712.

The reliability standards setting field 702 is a field for setting a standard for determining the reliability of the transition probability of a process pair. The reliability standards setting field 702 includes a threshold setting field 721. The threshold setting field 721 is a field for setting a threshold for the number of process pairs generated based on the plan history, which are present within an area centered about a process pair generated by the input data 620.

A specific rule, for example, a determination standard for the feature amount, may be set in the reliability standards setting field 702. For example, a rule that determines that there is no reliability when the absolute value of the delivery deadline is 1 may be set.

The set button 703 is an operation button for setting the setting data 621 of reliability standards including values set in the area setting field 701 and the reliability standards setting field 702.

The input screen 700 illustrated in FIG. 7 is one example, and is not limited thereto. The input screen 700 is only required to be a screen in which standards for identifying a process pair that does not appear often in the plan history can be set. In this manner, it is possible to set standards for the reliability in accordance with the user's requirement. Now, the description of FIG. 6 is given again.

The candidate plan generating unit 603 generates the candidate plan 623. The candidate plan generating unit 603 includes a transition probability calculating unit 610, a reliability determining unit 611, and a transition probability modifying unit 612.

The transition probability calculating unit 610 uses the model to calculate the transition probability of a process pair generated based on the input data 620. Further, the transition probability calculating unit 610 generates and outputs the candidate plan 623 based on the transition probability of the process pair. In the first embodiment, the transition probability of a part of process pairs is modified by the transition probability modifying unit 612.

The reliability determining unit 611 calculates a degree of reliability indicating the reliability of the transition probability of a process pair based on the value set in the area setting field 701.

The transition probability modifying unit 612 determines whether the transition probability of a process pair is reliable based on the value set in the reliability standards setting field 702 and the degree of reliability of the process pair. In a case where it is determined that the transition probability of the process pair is not reliable, the transition probability modifying unit 612 modifies the transition probability of the process pair.

The transition probability modifying unit 612 may include the functions of the reliability determining unit 611 and the feature amount extracting unit 601.

Figure 8:
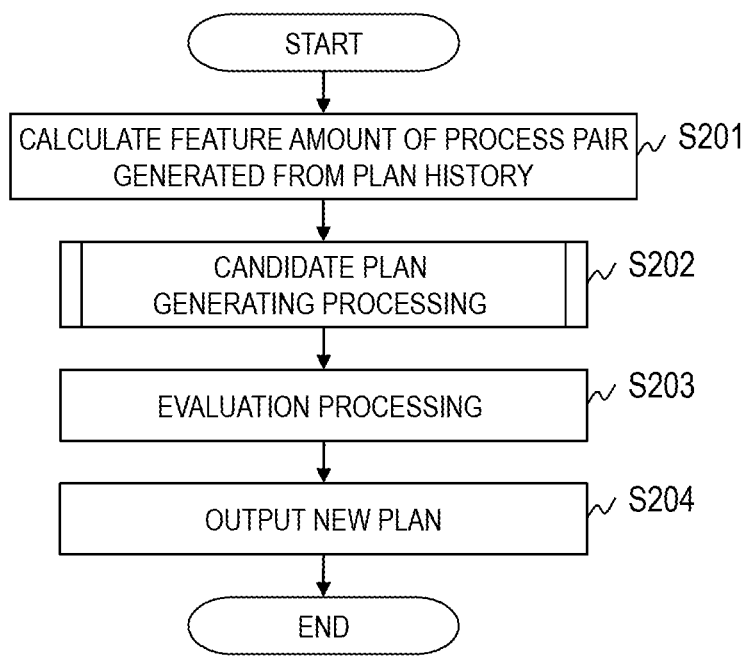
FIG. 8 is a flow chart for illustrating an example of plan generating processing to be executed by the computer in the first embodiment.

Next, a description is given of processing for generating a new plan. FIG. 8 is a flow chart for illustrating an example of plan generating processing to be executed by the computer 100 in the first embodiment.

In a case where the computer 100 receives the input data 620, the computer 100 starts the plan generating processing. The computer 100 receives input of information on the model to be used together with the input data 620.

First, the plan generating unit 111 of the computer 100 identifies a plan history used for generating the specified model, and extracts the feature amount of each of process pairs formed based on the identified plan history (Step S201). Specifically, the following processing is executed.

(Step S201-1) The feature amount extracting unit 601 refers to the model management information 400 based on the identification information on the model to identify a plan history, and obtains the identified plan history from the plan history database 120.

(Step S201-2) The feature amount extracting unit 601 generates process pairs based on processes included in the obtained plan history, and calculates the feature amount of each of the process pairs. This concludes the description of the processing of Step S201.

Next, the plan generating unit 111 of the computer 100 executes candidate plan generating processing in order to generate the candidate plan 623 (Step S202). Details of the candidate plan generating processing are described with reference to FIG. 9.

Next, the plan evaluation unit 112 of the computer 100 executes evaluation processing for the candidate plan 623 (Step S203). The evaluation processing is the same as that of WO 2018/220744, and thus a detailed description thereof is omitted here. Specifically, the following processing is executed.

(Step S203-1) The plan evaluation unit 112 calculates a violation point of each constraint condition for one candidate plan 623 based on the constraint condition database 121 and the evaluation index management information 410 included in the learning result database 122. The violation point of one constraint condition is calculated based on the total value of the amount of violation of the constraint condition by the candidate plan 623 and the maximum violation amount and the violation frequency of the constraint condition obtained from the evaluation index management information 410. Similar processing is executed for each candidate plan 623.

(Step S203-2) The plan evaluation unit 112 calculates the total value of violation points of constraint conditions as the evaluation value of the candidate plan 623.

(Step S203-3) The plan evaluation unit 112 selects the candidate plan 623 with the smallest evaluation value as the new plan.

Next, the plan output unit 113 of the computer 100 outputs the candidate plan 623 selected by the plan evaluation unit 112 as the new plan (Step S204). After that, the computer 100 ends the plan generating processing.

Figure 9:
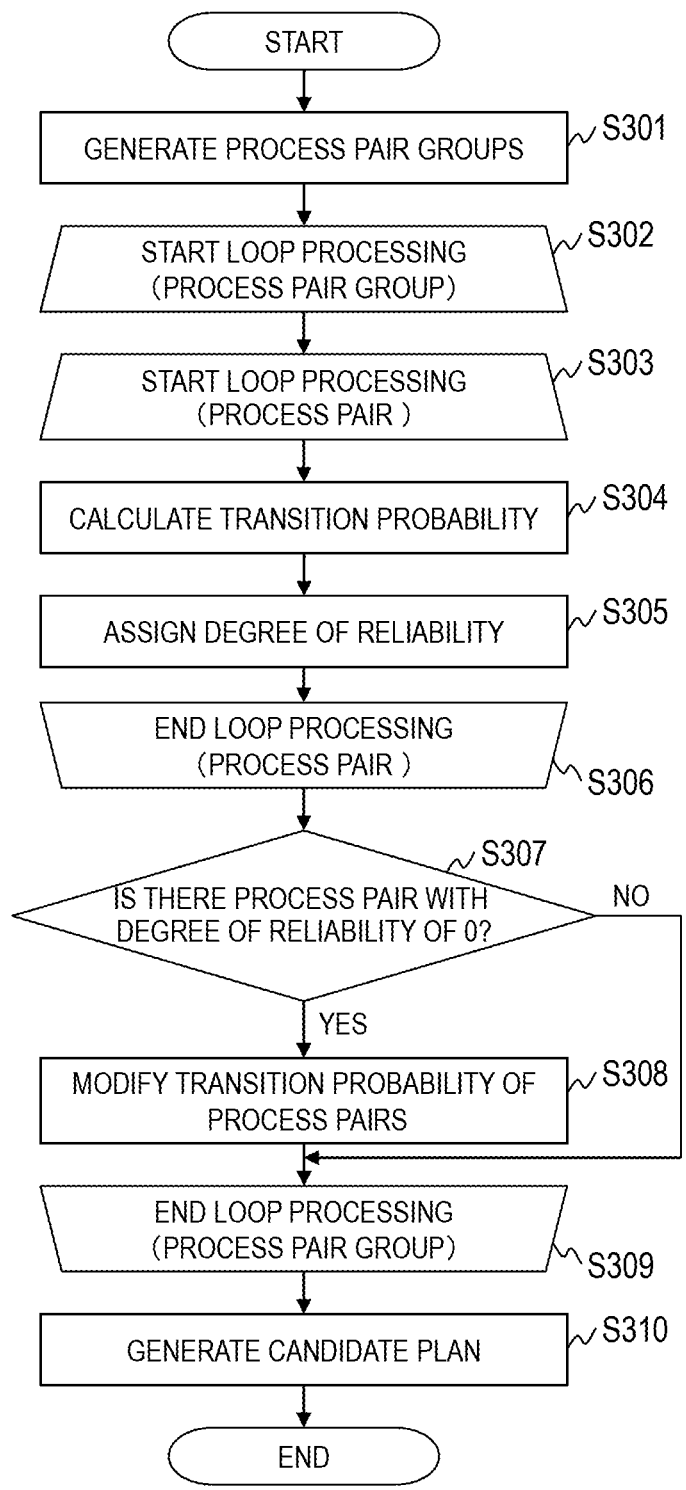
FIG. 9 is a flow chart for illustrating an example of candidate plan generating processing to be executed by a candidate plan generating unit in the first embodiment.

FIG. 9 is a flow chart for illustrating an example of candidate plan generating processing to be executed by the candidate plan generating unit 603 in the first embodiment. It is assumed that the input data 620, the feature amount of the each of the process pairs generated based on the plan history, and the setting data 621 of reliability standards are input to the candidate plan generating unit 603.

The transition probability calculating unit 610 generates process pair groups (Step S301).

Specifically, the transition probability calculating unit 610 generates process pairs based on a plurality of processes included in the input data 620. The transition probability calculating unit 610 generates process pair groups. A process pair groups includes, as elements, process pairs whose reference process are same.

Next, the transition probability calculating unit 610 starts loop processing for the process pair group (Step S302). The transition probability calculating unit 610 selects a target process pair group from among the process pair groups.

Next, the transition probability calculating unit 610 starts loop processing for the process pair (Step S303). The transition probability calculating unit 610 selects a target process pair from among the process pairs included in the target process pair group.

Next, the transition probability calculating unit 610 inputs the feature amount of the target process pair to the model, to thereby calculate the transition probability of the target process pair (Step S304), and after that, calls the reliability determining unit 611.

Next, the reliability determining unit 611 assigns a degree of reliability indicating the reliability of the transition probability of the target process pair (Step S305). Specifically, the following processing is executed.

(Step S305-1) The reliability determining unit 611 sets, in the feature amount space, an area having a size defined by the area setting field 701, which is centered about the feature amount of the target process pair. The reliability determining unit 611 plots, in the feature amount space, the feature amount of the each of the process pairs formed based on the plan history, and counts the number of the process pairs included in the set area.

(Step S305-2) The reliability determining unit 611 determines whether the number of the process pairs included in the area is smaller than a threshold set in the reliability standards setting field 702. In other words, it is determined whether the target process pair is a process pair that does not appear often in the plan history. In a case where the number of the process pairs included in the area is smaller than the threshold, the target process pair is determined to be a process pair that does not appear often in the plan history.

It is assumed that learning for the model is not sufficient for the process pair that does not appear often in the plan history. Thus, the reliability of the transition probability of that process pair is considered to be low.

(Step S305-3) The reliability determining unit 611 assigns the degree of reliability based on the determination result (Step S305-2). Specifically, in a case where the number of the process pairs included in the area is smaller than the threshold, the reliability determining unit 611 assigns "0" as the degree of reliability, whereas in a case where the number of the process pairs included in the area is equal to or larger than the threshold, the reliability determining unit 611 assigns "1" as the degree of reliability. The reliability determining unit 611 associates the degree of reliability with the target process pair. After that, the reliability determining unit 611 notifies the transition probability calculating unit 610 of the fact that assignment of the degree of reliability is complete.

In the case of rule-based determination, the reliability determining unit 611 determines the reliability of the transition probability of the target process pair based on a rule. This concludes the description of the processing of Step S305.

Next, the transition probability calculating unit 610 determines whether processing is complete for all the process pairs included in the target process pair group (Step S306).

In a case where it is determined that processing is not complete for all the process pairs included in the target process pair group, the transition probability calculating unit 610 returns to Step S303 to execute similar processing. In a case where it is determined that processing is complete for all the process pairs included in the target process pair group, the transition probability calculating unit 610 calls the transition probability modifying unit 612.

The transition probability modifying unit 612 determines whether a process pair with the degree of reliability of "0" is included in the target process pair group (Step S307).

In a case where it is determined that a process pair with the degree of reliability of "0" is not included in the target process pair group, the transition probability modifying unit 612 notifies the transition probability calculating unit 610 of completion of the processing. In a case where it is determined that a process pair with the degree of reliability of "0" is included in the target process pair group, the transition probability modifying unit 612 modifies the transition probability of each process pair included in the target process pair group (Step S308), and after that, notifies the transition probability calculating unit 610 of completion of the processing.

For example, the transition probability calculating unit 610 modifies the transition probabilities of all the process pairs of the target process pair group to the same value. Further, the transition probability calculating unit 610 modifies the transition probability of each process pair so that the minimum value of the transition probabilities of process pairs is larger than a standard value. The above-mentioned method of modifying the transition probability of a process pair is one example, and is not limited thereto.

In this manner, in a case where there is a process pair with a low reliability of the transition probability in the process pair group, the transition probability calculating unit 610 modifies the transition probability of each process pair so as not to depend on the model. With this, it is possible to generate a plan including a process pair that is less likely to be selected based on the model.

In a case where of receiving a notification from the transition probability modifying unit 612, the transition probability calculating unit 610 determines whether processing is complete for all the process pair groups (Step S309).

In a case where it is determined that processing is not complete for all the process pair groups, the transition probability calculating unit 610 returns to Step S302 to execute similar processing. In a case where it is determined that processing is complete for all the process pair groups, the transition probability calculating unit 610 generates a candidate plan based on the transition probabilities of process pairs included in all the process pair groups (Step S310). After that, the candidate plan generating unit 603 ends the candidate plan generating processing.

For example, the transition probability calculating unit 610 generates the candidate plan 623 by random-number selection with a weighted transition probability. The number of candidate plans to be generated may be two or more.

After the candidate plan generating unit 603 has generated the process pair, the candidate plan generating unit 603 may execute processing of from Step S303 to Step S306 to generate a process pair group, and start loop processing for the process pair. In this case, the processing of Step S307 and Step S308 is executed for each process pair group.

According to the first embodiment, in a case where the reliability of the transition probability of a process pair is low, the candidate plan generating unit 603 modifies the transition probability of the process pair so as not to depend on the model. With this, it is possible to improve the possibility of generating a candidate plan including a process pair that is less likely to be selected based on the model. In other words, it is possible to generate an optimal plan even under exceptional cases.

Second Embodiment

In a second embodiment of this invention, the candidate plan generating unit 603 presents a modification proposal of the transition probabilities of process pairs, and the user determines whether to adopt the modification proposal of the transition probabilities of the process pairs. Now, a description is given of the second embodiment with a focus on the difference from the first embodiment.

The hardware configuration and software configuration of the computer 100 in the second embodiment are the same as those of the first embodiment. Learning processing to be executed by the learning unit 110 in the second embodiment is the same as that of the first embodiment. Processing to be executed by the plan evaluation unit 112 and the plan output unit 113 in the second embodiment is the same as that of the first embodiment. The plan generating processing to be executed by the plan generating unit 111 in the second embodiment is the same as that of the first embodiment.

The candidate plan generating processing to be executed by the candidate plan generating unit 603 in the second embodiment is partially different from that of the first embodiment. Specifically, in Step S308, the transition probability modifying unit 612 presents, to the user, a modification proposal of the transition probability of each process pair included in the process pair group.

FIG. 10 is a diagram for illustrating an example of a screen 1000 to be presented by the candidate plan generating unit 603 in the second embodiment.

The screen 1000 includes modification proposal information 1001, a graph display field 1002, an apply button 1003, and a cancel button 1004.

The modification proposal information 1001 is information indicating a modification proposal of the transition probabilities of process pairs included in the process pair group. The modification proposal information 1001 includes an entry formed of a transition destination process 1011, a feature amount 1012, a transition probability 1013, a degree of reliability 1014, and a transition probability 1015. There is one entry for one process pair.

The transition destination process 1011 is a field for storing identification information on a process (transition destination process) to which the reference process transitions. The feature amount 1012 is a field for storing the feature amount of a process pair. The transition probability 1013 is a field for storing the transition probability before modification. The degree of reliability 1014 is a field for storing the degree of reliability of the transition probability of a process pair. The transition probability 1015 is a field for storing the transition probability after modification.

The graph display field 1002 is a field for displaying a graph in which the feature amounts of the process pairs formed based on the plan history and the feature amounts of the process pairs included in the process pair group are plotted in the feature amount space.

The apply button 1003 is an operation button for applying the proposed modification proposal. The cancel button 1004 is an operation button for canceling the proposed modification proposal.

In Step S308, in a case where the apply button 1003 is operated, the transition probability modifying unit 612 modifies the transition probabilities of the process pairs, and notifies the transition probability calculating unit 610 of completion of processing. In a case where the cancel button 1004 is operated, the transition probability modifying unit 612 notifies the transition probability calculating unit 610 of completion of processing without modifying the transition probabilities of the process pairs.

According to the second embodiment, it is possible to generate an optimal plan more efficiently and accurately by reflecting the intention of the user.

Third Embodiment

In a third embodiment of this invention, learning data is generated by using the feature amount of a process pair with a low reliability of the transition probability. Now, a description is given of the third embodiment with a focus on the difference from the first embodiment.

Figure 11:
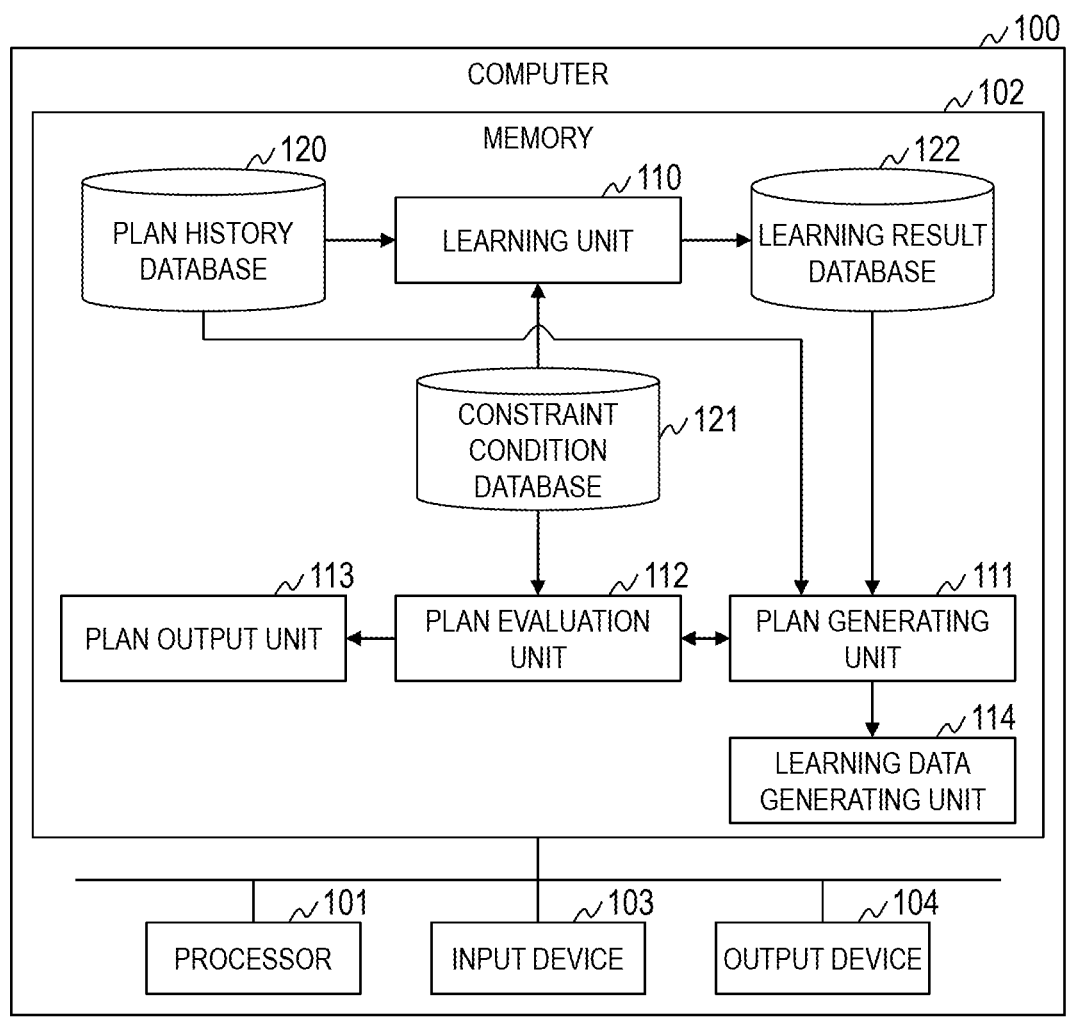
FIG. 11 is a diagram for illustrating a hardware configuration and software configuration of the computer in the third embodiment.

FIG. 11 is a diagram for illustrating a hardware configuration and software configuration of the computer 100 in the third embodiment.

The hardware configuration of the computer 100 in the third embodiment is the same as that of the first embodiment. The software configuration of the computer 100 in the third embodiment is partially different from that of the first embodiment. Specifically, the computer 100 includes a learning data generating unit 114.

The learning processing to be executed by the learning unit 110 in the third embodiment is the same as that of the first embodiment. Processing to be executed by the plan evaluation unit 112 and the plan output unit 113 in the third embodiment is the same as that of the first embodiment. The plan generating processing to be executed by the plan generating unit 111 in the third embodiment is the same as that of the first embodiment.

The candidate plan generating processing to be executed by the candidate plan generating unit 603 in the third embodiment is partially different from that of the first embodiment. Specifically, in Step S305, in a case where the degree of reliability is "0", the reliability determining unit 611 outputs, to the learning data generating unit 114, a learning data generation request including the identification information on the model, the target process pair, and the feature amount of the target process pair.

The learning data generating unit 114 generates the learning data by using the feature amount of the target process pair. For example, the learning data is generated by changing the feature amount of the target process pair perturbatively. The method of setting the label is the same as the method described in Step S102.

The learning data generating unit 114 stores the identification information on the model and the learning data in the memory 102.

In the third embodiment, the learning unit 110 executes relearning processing. The relearning processing is almost the same as the learning processing, but is partially different. Specifically, in Step S102, the learning unit 110 obtains the learning data with which the identification information on the model to be relearned is associated.

According to the third embodiment, it is possible to improve the accuracy of the model by adding learning data on a process pair with a low appearance frequency and performing relearning.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, which is configured to generate a plan that defines an order of execution of a plurality of processes,
comprising at least one computer having an arithmetic device and a storage device,
holding model management information for managing a model for calculating, based on a feature amount of a process pair generated based on a plan history and formed of two processes, a transition probability of the two processes forming the process pair, and
comprising:

a transition probability calculating unit configured to, in a case of receiving input data including a plurality of target processes, use the model management information and a feature amount of a process pair formed of a reference target process and a transition destination target process, to thereby calculate a transition probability of the process pair; and a transition probability modifying unit configured to: determine whether the transition probability of the process pair is reliable based on an evaluation standard; and modify the transition probability of the process pair determined to be unreliable, and the transition probability calculating unit being configured to generate a new plan by determining the order of execution of the plurality of target processes based on the transition probability of the process pair.

2. The computer system according to claim 1, wherein the computer system holds the plan history that has been used to generate the model management information, wherein the transition probability modifying unit is configured to:

generate history process pairs based on the plan history, and calculate a feature amount of each of the history process pairs;

calculate a number of history process pairs present within a predetermined area centered about the feature amount of the process pair in a feature amount space, based on the feature amount of the process pair and the feature amounts of the history process pairs; and determine whether the transition probability of the process pair is reliable based on a result of comparison between the number of history process pairs and a threshold.

3. The computer system according to claim 1, wherein the computer system holds rule information that defines a standard for determining whether the transition probability of the process pair is reliable, and wherein the transition probability modifying unit is configured to determine whether the transition probability of the process pair is reliable based on the rule information.

4. The computer system according to claim 2, wherein the computer system is configured to provide a first interface for setting a determination standard for determining whether the transition probability of the process pair is reliable.

5. The computer system according to claim 1, wherein the transition probability modifying unit is configured to:

present a second interface indicating details of modification of the transition probability of the process pair; and modify the transition probability of the process pair in a case where a notification indicating that the transition probability of the process pair is to be modified is received via the second interface.

6. The computer system according to claim 1, wherein the transition probability calculating unit is configured to:

generate a pair group including process pairs having the same reference target process; and perform, in a case where the pair group includes at least one of a process pair for which the transition probability is determined to be unreliable, one of: modification of transition probabilities of the process pairs included in the pair group to the same value; and modification of transition probabilities of the process pairs included in the pair group so that a minimum value of the transition probabilities of the process pairs included in the pair group is larger than a predetermined value.

7. The computer system according to claim 1, further comprising a learning data generating unit configured to generate learning data for generating the model management information, based on the feature amount of the process pair for which the transition probability is determined to be unreliable.

8. A generation method of a plan that defines an order of execution of a plurality of processes, which is executed by a computer system, the computer system including at least one computer having an arithmetic device and a storage device, and holding model management information for managing a model for calculating, based on a feature amount of a process pair generated based on a plan history and formed of two processes, a transition probability of the two processes forming the process pair, the generation method of a plan including:

a first step of using, by the arithmetic device, in a case of receiving input data including a plurality of target processes, the model management information and a feature amount of a process pair formed of a reference target process and a transition destination target process, to thereby calculate a transition probability of the process pair;

a second step of determining, by the arithmetic device, whether the transition probability of the process pair is reliable based on an evaluation standard;

a third step of modifying, by the arithmetic device, the transition probability of the process pair determined to be unreliable; and a fourth step of generating, by the arithmetic device, a new plan by determining the order of execution of the plurality of target processes based on the transition probability of the process pair.

9. The generation method of a plan according to claim 8, wherein the computer system holds the plan history that has been used to generate the model management information, and wherein the second step includes:

a step of generating, by the arithmetic device, history process pairs based on the plan history, and calculating a feature amount of each of the history process pairs;

a step of calculating, by the arithmetic device, a number of history process pairs present within a predetermined area centered about the feature amount of the process pair in a feature amount space, based on the feature amount of the process pair and the feature amounts of the history process pairs; and a step of determining, by the arithmetic device, whether the transition probability of the process pair is reliable based on a result of comparison between the number of history process pairs and a threshold.

10. The generation method of a plan according to claim 8, wherein the computer system holds rule information that defines a standard for determining whether the transition probability of the process pair is reliable, and wherein the second step includes a step of determining, by the arithmetic device, whether the transition probability of the process pair is reliable based on the rule information.

11. The generation method of a plan according to claim 9, further including a step of providing, by the arithmetic device, a first interface for setting a determination standard for determining whether the transition probability of the process pair is reliable.

12. The generation method of a plan according to claim 8, wherein the third step includes:
    a step of presenting, by the arithmetic device, a second interface indicating details of modification of the transition probability of the process pair; and
    a step of modifying, by the arithmetic device, the transition probability of the process pair in a case where a notification indicating that the transition probability of the process pair is to be modified is received via the second interface.

13. The generation method of a plan according to claim 8, wherein the third step includes:
    a step of generating, by the arithmetic device, a pair group including process pairs having the same reference target process; and
    a step of performing, by the arithmetic device, in a case where the pair group includes at least one of a process pair for which the transition probability is determined to be unreliable, one of: modification of transition probabilities of the process pairs included in the pair group to the same value; and modification of transition probabilities of the process pairs included in the pair group so that a minimum value of the transition probabilities of the process pairs included in the pair group is larger than a predetermined value.

14. The generation method of a plan according to claim 8, further including a step of generating, by the arithmetic device, learning data for generating the model management information, based on the feature amount of the process pair for which the transition probability is determined to be unreliable.

15. A non-transitory computer readable storage medium having stored thereon a program for causing a computer to generate a plan that defines an order of execution of a plurality of processes,
    wherein the computer has an arithmetic device and a storage device, and holds model management information for managing a model for calculating, based on a feature amount of a process pair generated based on a plan history and formed of two processes, a transition probability of the two processes forming the process pair,
    the program causing the computer to execute the procedures of:
    using, in a case of receiving input data including a plurality of target processes, the model management information and a feature amount of a process pair formed of a reference target process and a transition destination target process, to thereby calculate a transition probability of the process pair;
    determining whether the transition probability of the process pair is reliable based on an evaluation standard;
    modifying the transition probability of the process pair determined to be unreliable; and
    generating a new plan by determining the order of execution of the plurality of target processes based on the transition probability of the process pair.

* * * * *